US009098940B2

(12) United States Patent
Cao et al.

(10) Patent No.: US 9,098,940 B2
(45) Date of Patent: Aug. 4, 2015

(54) METHOD, APPARATUS AND SYSTEM FOR PROCESSING GRAPHIC OBJECTS

(75) Inventors: Rong Zeng Cao, Beijing (CN); Feng Li, Beijing (CN); Chun Hua Tian, Beijing (CN); Jing Min Xu, Beijing (CN); Hao Zhang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 559 days.

(21) Appl. No.: 12/762,608

(22) Filed: Apr. 19, 2010

(65) Prior Publication Data

US 2010/0281359 A1 Nov. 4, 2010

(30) Foreign Application Priority Data

Apr. 30, 2009 (CN) .......................... 2009 1 0132268

(51) Int. Cl.
G06F 3/14 (2006.01)
G06T 11/20 (2006.01)
(52) U.S. Cl.
CPC .................................. G06T 11/206 (2013.01)
(58) Field of Classification Search
CPC .................................................... G06T 11/206
USPC ......................................... 715/243, 810, 812
See application file for complete search history.

(56) References Cited

U.S. PATENT DOCUMENTS

| 4,764,867 | A | * | 8/1988 | Hess | 715/853 |
|---|---|---|---|---|---|
| 5,276,791 | A | * | 1/1994 | Palmer | 715/207 |
| 5,386,508 | A | * | 1/1995 | Itonori et al. | 717/109 |
| 5,596,704 | A | * | 1/1997 | Geddes et al. | 715/763 |
| 6,054,986 | A | * | 4/2000 | Kato | 715/763 |
| 6,396,488 | B1 | * | 5/2002 | Simmons et al. | 715/812 |
| 6,721,463 | B2 | * | 4/2004 | Naoi et al. | 382/305 |
| 6,732,114 | B1 | | 5/2004 | Aamodt et al. | |
| 6,784,902 | B1 | * | 8/2004 | Melder et al. | 715/771 |
| 2004/0049574 | A1 | * | 3/2004 | Watson et al. | 709/224 |
| 2005/0273761 | A1 | * | 12/2005 | Torgerson | 717/113 |
| 2005/0289526 | A1 | * | 12/2005 | Wang et al. | 717/144 |
| 2007/0089080 | A1 | | 4/2007 | Sakuraba | |
| 2007/0208996 | A1 | | 9/2007 | Berkner et al. | |

(Continued)

FOREIGN PATENT DOCUMENTS

CN 1137655 A 12/1996

*Primary Examiner* — Stephen Hong
*Assistant Examiner* — Marshon Robinson
(74) *Attorney, Agent, or Firm* — Garg Law Firm, PLLC; Rakesh Garg; Jennifer R. Davis

(57) ABSTRACT

The present application discloses a method, apparatus and system for processing graphic objects in a flow diagram. Said method comprises obtaining a flow diagram and execution stage information generated when executing said flow diagram; obtaining a layout policy, wherein said layout policy at least designates the conditions for determining a primary path in the flow diagram using the execution stage information; determining the primary path using the execution stage information based on the layout policy; and displaying prominently said primary path during displaying said flow diagram. Owing to the present invention, the elements, such as a primary path, in a diagram in which a user takes interest can be found by the user easily to facilitate the user to understand the diagram. Furthermore, the diagram automatically arranged using the present invention is usually clear enough so that it is almost not required to be manually adjusted by the user.

17 Claims, 12 Drawing Sheets

(56) References Cited

U.S. PATENT DOCUMENTS

| | | |
|---|---|---|
| 2008/0126922 A1* | 5/2008 | Yahata et al. ............... 715/201 |
| 2008/0163084 A1* | 7/2008 | Gottlieb et al. ............. 715/762 |
| 2008/0184143 A1* | 7/2008 | Gottlieb et al. ............. 715/764 |
| 2008/0256486 A1 | 10/2008 | Hagiwara |
| 2009/0178021 A1* | 7/2009 | Alluri ......................... 717/104 |
| 2009/0327942 A1* | 12/2009 | Eldridge et al. ............. 715/771 |
| 2011/0314250 A1* | 12/2011 | Innan et al. ................. 711/206 |

* cited by examiner

*FIG. 4*

| | | |
|---|---|---|
| [05-11-8 17:05:56:064 CST] 0000007e SYSTEM OUT | O GET OUR STOCK! APPLE | // GET OUR STOCK OF APPLE PRODUCTS |
| [05-11-8 17:05:57:476 CST] 00000086 SYSTEM OUT | O RESULT:50 | // THERE ARE 50 PRODUCTS KEPT IN STOCK |
| [05-11-8 17:05:57:476 CST] 00000086 SYSTEM OUT | O NUMBER:12 | // PICK UP 12 PRODUCTS |
| [05-11-8 17:05:57:476 CST] 00000086 SYSTEM OUT | O MINUS:38 | // 38 PRODUCT REMAIN |
| [05-11-8 17:05:58:177 CST] 00000086 SYSTEM OUT | O ORDER FOR APPLE, NUMBER 12 SENT! | // TO THE ORDER FOR APPLE PRODUCTS, SENT 12 PRODUCTS |

METHOD, APPARATUS AND SYSTEM FOR PROCESSING GRAPHIC OBJECTS

FIELD OF THE INVENTION

The present invention relates to graph layout technologies, and more particularly, to a method, apparatus and system for processing graphic objects in a flow diagram.

BACKGROUND OF THE INVENTION

A diagram editor is a development environment that automatically generates visual graphs for users. Microsoft® Visio is a more commonly used diagram editor among the existing ones and it allows the users to edit graphic objects and connection relations therebetween in a mouse drag and drop manner. After the graphic objects and the connection relations therebetween are determined, a graph can be automatically generated, and then the users may either manually adjust the graphic objects in the generated graph or only manually arrange the graphic objects in the graph thereby to generate a graph with a desired layout. Generally, the graph layout refers to how to arrange a plurality of objects with specified geometrical shapes within a limited space based on the specified requirements. The graph layout is one of the elements of graph design. Whether the graph layout is reasonable significantly influences the actual effect of a graph.

A plurality of layout algorithms are available in the prior art, and these algorithms are very useful for representing the relations between graphic objects and can calculate positions of connection lines, positions of nodes or both so as to generate a visual graph that for example presents data. FIG. 1A-FIG. 1B show schematic examples of graph layouts that can be carried out using the existing diagram editors. The results obtained from the existing layout algorithms fail to completely satisfy the users' needs. FIG. 2 is a schematic representation of a visual graph of an order processing flow generated using the existing diagram editors. According to this figure, all graphic objects are uniformly distributed without crossings of connection lines, but it cannot be found therefrom which path or paths are primary path or paths and which paths are secondary paths. The reason is that the existing algorithms do not consider semantic meanings of the graphic objects while all the graphic objects are merely treated as plain boxes. In other words, the purpose of the existing algorithms is graphics-oriented and they intend to optimize some visual metrics, such as the number of crossings of connection lines, the distribution uniformity of graphic objects, etc. However, the above-mentioned visual metrics may not be the metrics the users care most. For example, the commonly used industrial flow diagrams usually have tens of or even hundreds of possible processing paths and different users may care the practical execution conditions of different paths instead of the visual effect of the complete flow diagram. Taking the physical distribution system as an example, the transportation department cares which transport path is the most commonly used, while the storage department cares which articles are imported and exported most frequently into and out of repository, so that the primary paths different departments expect to view in a graph are obviously different.

SUMMARY OF THE INVENTION

In view of the foregoing problems existing in the prior art, the present invention provides a method and system for arranging graphic objects in a flow diagram with consideration of execution stage information. The flow diagram referred to in the present invention refers to any graph showing state transitions. A diagram execution engine executing a flow diagram collects, by itself, data generated in the process of executing the flow diagram and stores it in a memory, or provides some interface programs, such as API, to be invoked by users, so that the users can obtain the data generated in the process of executing the flow diagram. The users can further process the obtained data in accordance with a certain layout policy(ies) (e.g., to perform mathematical operations) thereby causing the processed data to reflect said layout policy. In the following text, the execution stage information includes any data related to execution of a flow diagram or services generated when the diagram execution engine executes the flow diagram and/or data obtained by processing the aforementioned data. After obtaining the execution stage information, a diagram arrangement unit arranges graphic objects in a graph based on the execution stage information so that the graphic objects and their connection paths conforming to the layout policy can be displayed prominently. Said prominent display can be realized by means of position arrangement, color change, highlight and/or addition of annotation with respect to the graphic objects and their connections, and in addition, other graphic objects and other connections are correspondingly arranged, for example, it is possible to minimize the number of crossings of connection lines using the existing algorithms, and the like.

The present invention can be carried out in a plurality of implementations comprising a method, apparatus or system. As a method of processing graphic objects in a flow diagram, one embodiment of the present invention comprises at least the following operations: obtaining a flow diagram and execution stage information generated during executing said flow diagram; obtaining a layout policy, wherein said layout policy at least designates the conditions for determining a primary path in the flow diagram using the execution stage information; determining the primary path using the execution stage information based on the layout policy; and displaying prominently said primary path during displaying said flow diagram.

The present invention provides at least one of the following advantages: it is possible to arrange graphic objects in a flow diagram based on the execution stage information of the flow diagram, so that the elements (such as a primary path) in the diagram in which a user takes interest can be found by the user at a glance, and this is very important for the user to understand the diagram. Furthermore, the automatically arranged diagram is usually clear enough so that it is almost not required to be manually adjusted by the user.

BRIEF DESCRIPTION OF THE DRAWINGS

FIG. 4 is an exemplary schematic representation of a result that may be output by a diagram execution engine when executing a shipping node of the state machine as shown in FIG. 3.

DETAILED DESCRIPTION OF THE PREFERRED EMBODIMENTS

Figure 1A:
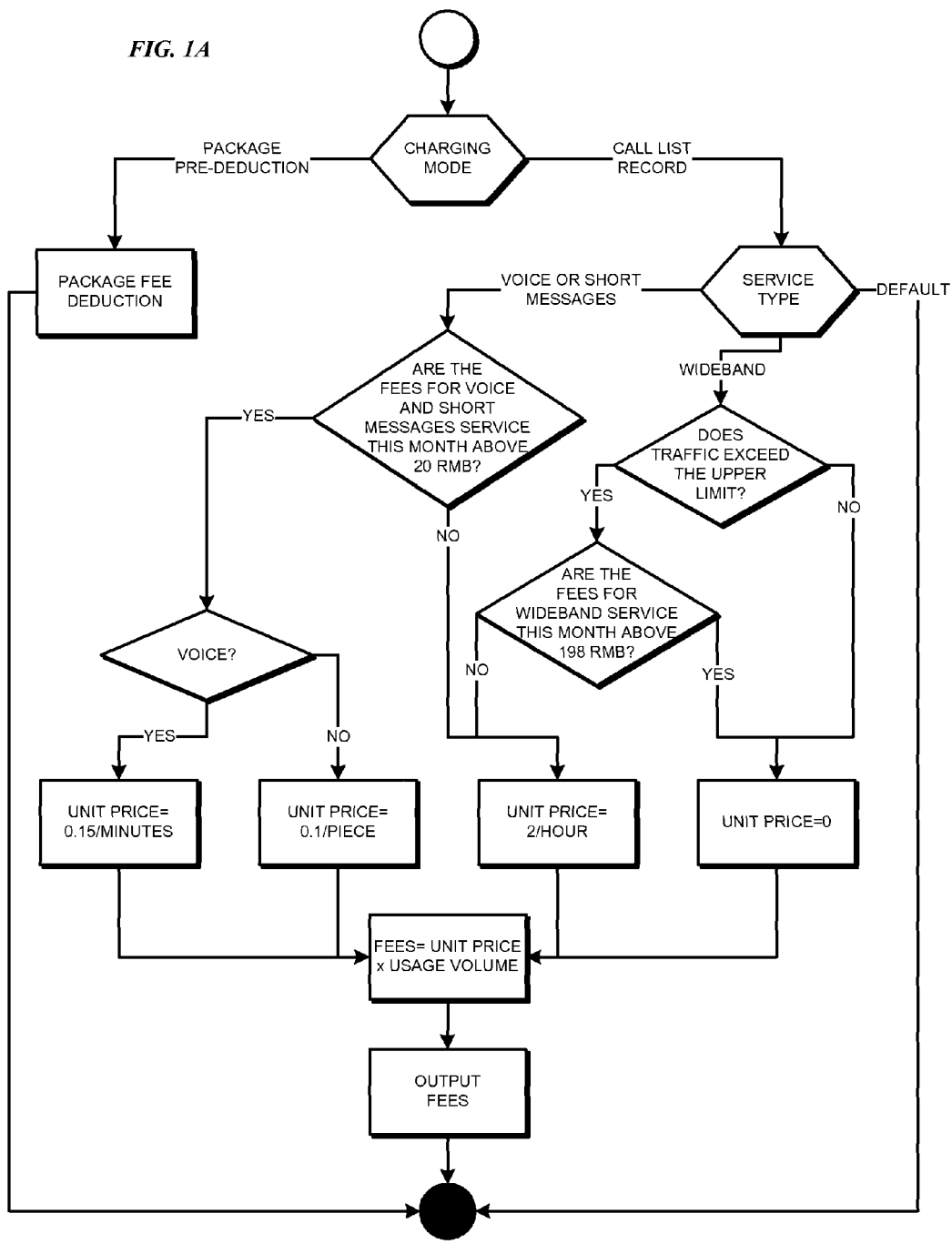
FIG. 1A-FIG. 1B show schematic examples of graph layouts that can be carried out using the existing diagram editors.

The present invention will now be described in terms of specific, exemplary embodiments. It is to be understood that the invention is not limited to the exemplary embodiments disclosed. It should also be understood that not every feature of the presently disclosed method and apparatus for arranging graphic objects based on execution stage information is necessary to implement the invention as claimed in any particular one of the appended claims. Various elements and features of devices are described to enable the invention to be fully implemented. It should also be understood that throughout this disclosure, where a process or method is shown or described, the steps of the method may be performed in any order or simultaneously, unless it is clear from the context that one step depends on another being performed first.

A diagram editor not only generates a visual graph, but also can usually generate a flow diagram topology file and a graph layout file. The flow diagram topology file describes service meanings of graphic objects themselves in the generated diagram and service relations between the graphic objects, but does not care about visual properties of the graphic objects. The flow diagram topology file is an execution basis of a diagram execution engine. The graph layout file describes visual properties of the graphic objects and of connections therebetween, such as the size, position, color, labels and the like of the graphic objects, as well as the length of the connections between the graphic objects, the presence of arrows, the labels thereon, and the like. The graph layout file is a basis for generating the visual graph. Indeed, not all diagram editors simultaneously generate the visual graph, the flow diagram topology file and the graph layout file.

What is described below is a portion of the graph layout file in an XML form which describes a subnode in a flow diagram.

```
<?xml version="1.0" encoding"UTF-8"?>
...
    <children xmi:type="notation:Node"
xmi:id="_ytP90MOfEd20ZYHoKMXpqA" type="1003">
        <styles xmi:type="notation:ShapeStyle"
xmi:id="_ytP90cOfEd20ZYHoKMXpqA" fontName="Song Ti"/>
        <element xmi:type="rule:BeginNode"
href="pm5.rule#_ytGM0MOfEd20ZYHoKMXpqA"/>
        <layoutConstraint xmi:type="notation:Bounds"
xmi:id="_ytP90sOfEd20ZYHoKMXpqA" x="99" y="268"/>
    </children>
...
```

The diagram editor can be integrated with the diagram execution engine to form an integrated operation environment. The diagram editor in this integrated operation environment can generate a flow diagram topology file to be invoked by the diagram execution engine.

The diagram execution engine executes a flow diagram based on the flow diagram topology so as to form a state machine. The state machine is a concept of a mathematical model and it is defined in mathematics as a directional graph composed of a set of states and a set of corresponding transition functions. The state machine "runs" by responding to a series of events. Each event falls under the control of a transition function in the "current state", wherein the range of the function is a subset of states. The function returns to the "next" (perhaps the same) state. There must be one end state among these states. Upon reaching the end state, the state machine stops. It is also possible that the flow diagram is cyclic, and then the state machine will not have the end state. Particularly speaking, the state machine is a special state and representing manner of the flow diagram. Compared with a common flow diagram, the state machine has a relatively direct and simple task. The diagram execution engine executes said flow diagram and outputs or stores in a memory some data generated in execution for use by others, and the data may comprise data generated from any state of said state machine. Since the data is generated by the diagram execution engine when executing said flow diagram, the data can be called execution stage data. Some diagram execution engines do not store the data generated in execution but provide some functions (such as an API, i.e. Application Programming Interface) to be invoked by the user thus to obtain the execution stage data.

Figure 2:
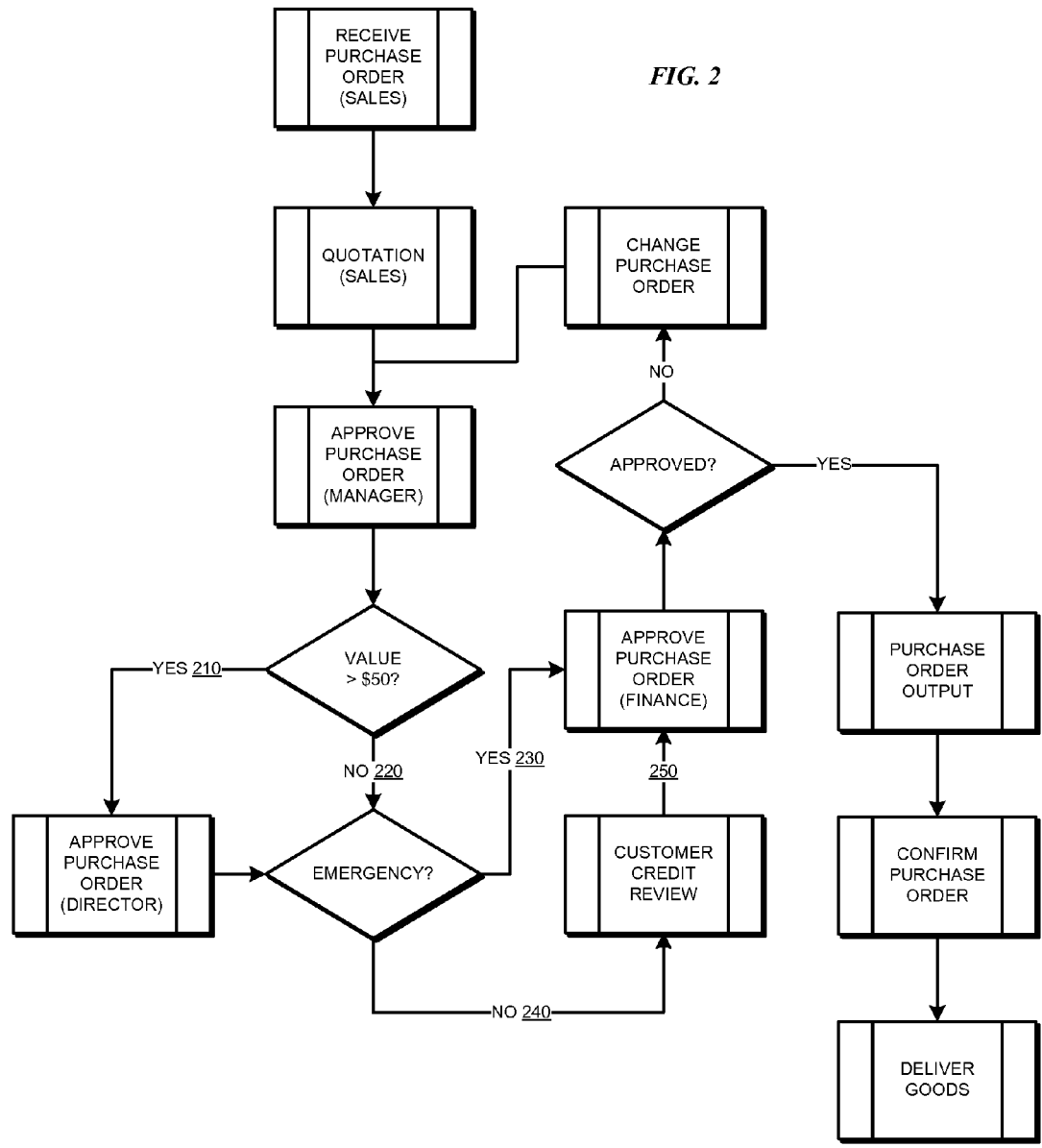
FIG. 2 is a schematic representation of a visual graph of an order processing flow generated using the existing diagram editors.
Figure 3:
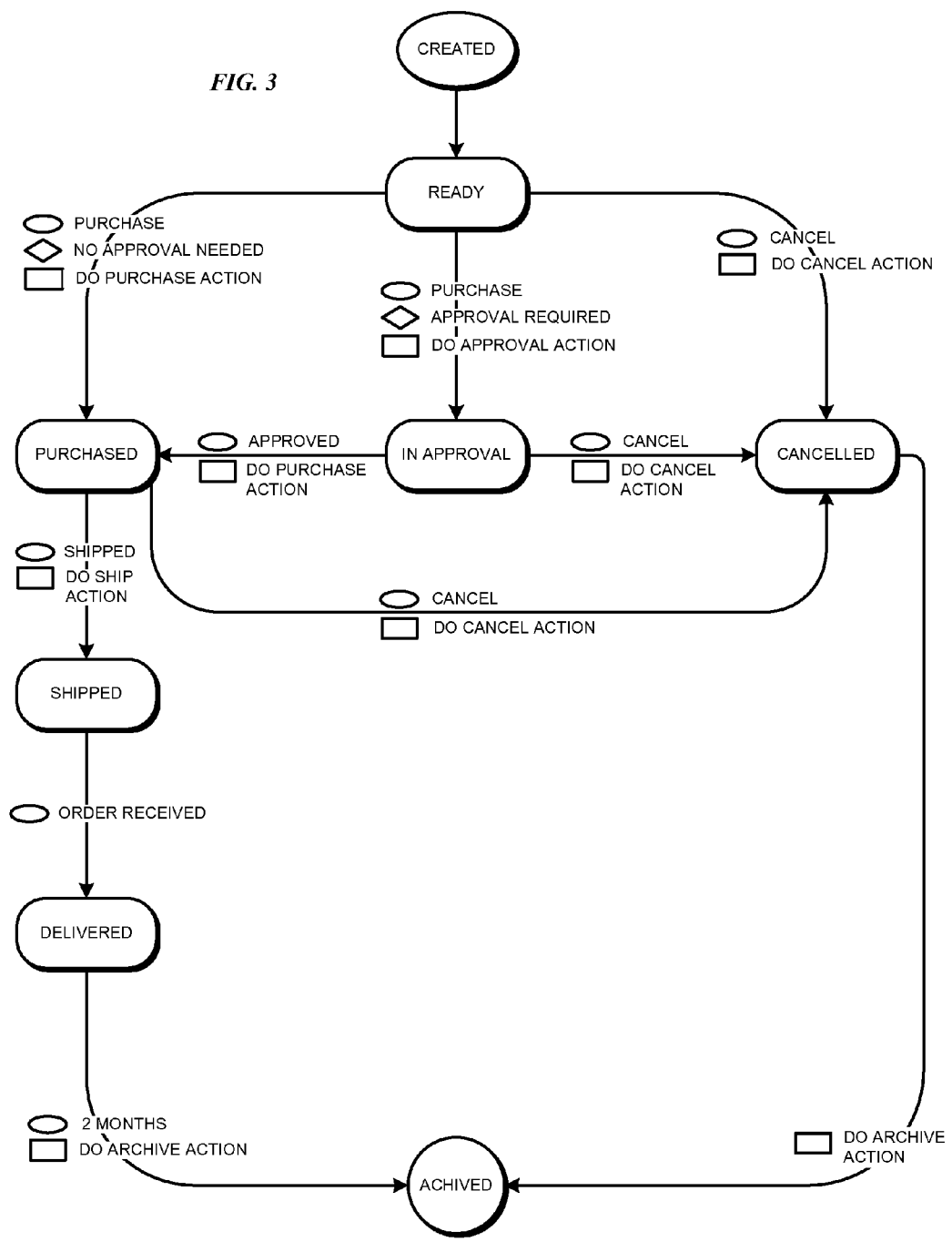
FIG. 3 shows a schematic view of a simple state machine representing the order processing flow as shown in FIG. 2.

Visual representation of a state machine is a state transition diagram. The state transition diagram shows its states using nodes, possible state transitions between the states using arrows, and events that trigger the state transitions using text on the arrows. FIG. 3 is a schematic view of a simple state machine representing the order processing flow as shown in FIG. 2.

Referring to FIG. 3, the nodes (rectangles shown in FIG. 3) represent possible states for the PurchaseOrder and may be Ready, InApproval, Purchased, Canceled, Shipped, Delivered, or Archived. The arcs with arrows in FIG. 3 represent events that may occur, causing the PurchaseOrder to transition from one state to another.

A state machine can be implemented by for example a BPEL (Business Process Execution Language) process. In that case, an event is merely an operation on the portType of a Web Services Description Language (WSDL)-described process. The current state (stored in a variable) determines which events (operations) are active. The runtime throws an exception if a caller attempts to invoke an invalid operation. The users can also query the state machine's current state to determine an operation's validity. When an event occurs (for example, when an operation is invoked or a timer is expired), the state machine transitions to a new state and performs an action associated with the transition (such as invoking an operation or method).

In FIG. 3, the state machine in the "Ready" state has two possible events (enabled operations): Purchase and Cancel. For the purchase operation, there are two possible conditions: either an approval is or is not needed.

When a caller invokes the purchase operation, the diagram execution engine performs the following operations:

1. Determines if the operation is valid for the current state.
2. Executes an exit action for the Ready state, if exists.

3. Evaluates the condition of all transitions associated with that event. Assuming an approval is needed for this purchase, the transition into the "InApproval" state will be selected, while the transition to "Purchased" will be ignored; otherwise, the transition into the "Purchased" state will be executed, while the transition to "InApproval" will be ignored.

4. Executes the action associated with the transition, in this case invoking doApprovalAction( ) For example, this operation could send e-mail to a sales manager or simply invoke an operation on another SOA (Service-Oriented Architecture) component, such as a BPEL flow.

5. Enters the new state.

6. Executes an entry action for the new state, if exists.

FIG. 4 is an exemplary schematic representation of a result that may be output at a shipping node by the diagram execution engine when executing according to the state machine as shown in FIG. 3. The output information shown in FIG. 4 is an example of execution stage information.

The present invention provides a method and system for arranging flow diagrams based on layout policies with real-time linkages between the flow design time and run time. The present invention relates to arranging a flow diagram based on a result of execution by linking a diagram editor to a diagram execution engine. This is very important for users to understand the flow diagram from the viewpoint of practical execution conditions, guide the diagram design, and make decisions.

The term "flow diagram" used herein refers to a diagram of a common type, which represents an algorithm or process. The flow diagram can be used in various fields to analyze, design, record in a documentation form or manage a processes or program.

The priority of graphic objects in the flow diagram can be calculated based on a large variety of execution stage information (which can also be tagged manually by users). For example, for the flow diagram as shown in FIG. 2, said execution stage information includes but is not limited to: node usage/visits/hits, terminated times, order amount, order type, node execution time, node cost, transaction volume (summed), transaction value, etc.

Specifically, the present invention provides a method and apparatus and a system comprising the apparatus, wherein while executing a flow diagram, a flow execution engine collects execution stage information (e.g. states and hit number of transitions) and provides it to the diagram editor. Then according to a layout policy, the diagram editor processes graphic objects based on a graph layout file and the execution stage information collected in the previous step. The collected execution stage information is used to at least determine a primary path according to the layout policy. The layout policy can specify one or more types of execution stage information as the condition for determining the primary path and for determining the primary path using the one or more types of execution stage information. The layout policy can specify which type of execution stage information has a higher priority for determining the primary path. Further, the layout policy can further specify which type or types of execution stage information are used to arrange other graphic objects than the primary path.

Figure 5:
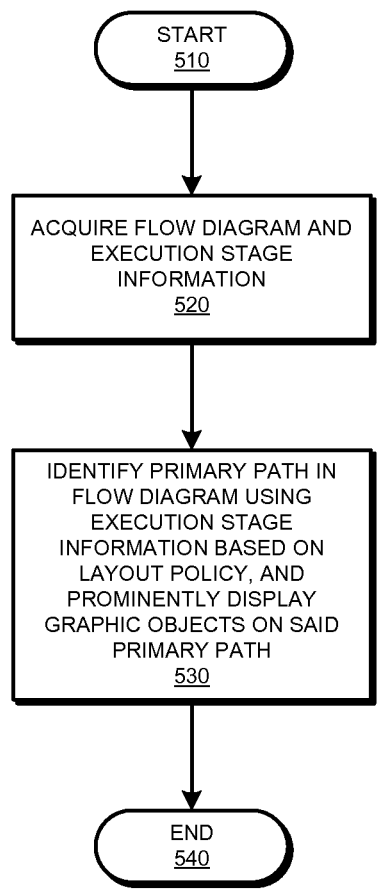
FIG. 5 shows an exemplary flow diagram of a method of arranging graphic objects in a flow diagram based on execution stage information according to the present invention.

FIG. 5 is an exemplary flow diagram of a method of arranging graphic objects in a flow diagram based on execution stage information according to the present invention.

At step 510, the processing flow starts.

At step 520, the execution stage information and the flow diagram are obtained.

As described above, the diagram editor generates a graph layout file (e.g. an XML file) describing a graph layout and stores it as a single file in a system for use by others. Thus, obtaining the flow diagram can be obtaining said graph layout file. In addition, it is also possible to obtain the flow diagram by obtaining a flow diagram topology file. It can be appreciated by those skilled in the art that, it is also possible to obtain the flow diagram in any other suitable manner, so long as the manner can uniquely determine graphic objects and mutual relations therebetween in the flow diagram. The diagram execution engine can execute the flow diagram a plurality of times so as to generate a plurality of sets of execution stage information.

Take again, as an example, the order processing flow as shown in FIG. 2. Each time an order is input to the diagram execution engine, each order has an order value and a required turnaround time. An order with the value greater than $50 is required to be approved by a director, so the processing flow passes through connection 210; an order with the value less than or equal to $50 is not required to be approved by the director, so the processing flow passes through connection 220. An order with the specially required turnaround time, e.g., an emergency order with the turnaround time less than or equal to 2 days, directly reaches the next processing module through connection 230; an order without the specially required turnaround time, e.g. a non-emergency order with the turnaround time more than 2 days, needs to reach the next processing module through connections 240 and 250.

The diagram execution engine collects relevant information while executing each order, for example, for an order with the value greater than $50 and the turnaround time less than 2 days, the diagram execution engine collects the paths the order passes through in the flow diagram, i.e. paths 210 and 230, and stores information of the paths in association with the order value and turnaround time of the order.

When the diagram execution engine does not store the execution stage information, it is necessary to insert probe points into the process for collecting the execution stage information. Said probe points refer to all means capable of invoking interface functions provided by the diagram execution engine to obtain the execution stage information, and include program code, modules, interface programs, etc. The execution stage information is collected by the probe points and then stored, for example, into a memory or as a data file or the like, so long as the data can be saved and accessed for a later process. In that case, it is further necessary to execute, between step 510 and step 520, the steps of defining the probe points and collecting the execution stage information using the probe points.

At step 530, a primary path in the flow diagram is identified using the execution stage information based on the layout policy, and graphic objects on the primary path are displayed prominently.

Said layout policy can not only be pre-defined and stored in a file or in a memory, but also real-time defined by the users when the users need to arrange the diagram. The layout policy can relate to which type or types of execution stage information are to be collected, and to the conditions for determining the primary path using such execution stage information. The layout policy can further specify which type or types of execution stage information should be used to arrange graphic objects. If a plurality of types of information is selected, the layout policy can specify the priority of each type.

Take again, as an example, the order processing flow as shown in FIG. 2. For example, a user-defined layout policy may be as follows: "arranging a path for processing orders with a value greater than $50 AND turnaround time less than 2 days as a primary path, and arranging according to the number of orders through each node and each path from most to least". In this layout policy, the former half portion specifies the indices for determining the primary path, while the latter half portion specifies the criterion according to which the graphic objects other than the primary path are arranged.

In order to quantize the user-defined layout policy, the user can define variables and metrics thereof for the layout policy for calculation later, and calculate the values of the metrics to obtain the values corresponding to the variables. For example, for the variable "turnaround time" in the above-mentioned policy, two metrics, i.e. "order submission time" and "goods received time", need to be defined, while for the variable "order value", only one metric, i.e. "order value", needs to be defined. The user can manually specify the values of these metrics. For the variable "number of orders through each node and each path" in the above-mentioned policy, two metrics, i.e. "order number 1" for each node and "order number 2" for each path, need to be defined.

The above-mentioned layout policy can finally be quantized as "(order submission time, goods received time, order value), (order number 1, order number 2, descending order)", thereby invoking probe points to obtain the corresponding values, wherein the content in the first parentheses is used to specify the basis for determining the primary path, while the content in the second parentheses is used to specify the basis for arranging graphic objects other than the primary path. If the user pre-defines and stores the above-mentioned layout policy, the quantized layout policy can be stored in the form of a table as follows:

| For Obtaining | | | For Arranging | | |
| --- | --- | --- | --- | --- | --- |
| Order Submission Time | Goods Received Time | Order Value | Order Number 1 | Order Number 2 | Descending Order |

Indeed, it is possible to represent and store the quantized user-defined layout policy in any other form that can be envisaged by those skilled in the art.

Based on the defined metrics, i.e. "order submission time"–"goods received time"<2 days and "order value">50, the corresponding connection paths are retrieved from the memory. In this example, the connection paths are denoted by 210 and 230. Then the retrieved nodes and connection paths are arranged into one line as the primary path.

If there exist multiple paths satisfying such a condition as "a path for processing orders with value greater than $50 and turnaround time less than 2 days", then it is possible to further specify how to select a primary path from the multiple paths. For example, it is possible to list in a diagram those nodes and paths with the greatest number of orders as the primary path, and arrange respective nodes and paths with the greatest number of orders into one line in the flow diagram. This is actually the same as the basis for arranging the graphic objects other than the primary path. Those skilled in the art can easily understand that, it is also possible to use a basis different from that for arranging the graphic objects other than the primary path.

Figure 6:
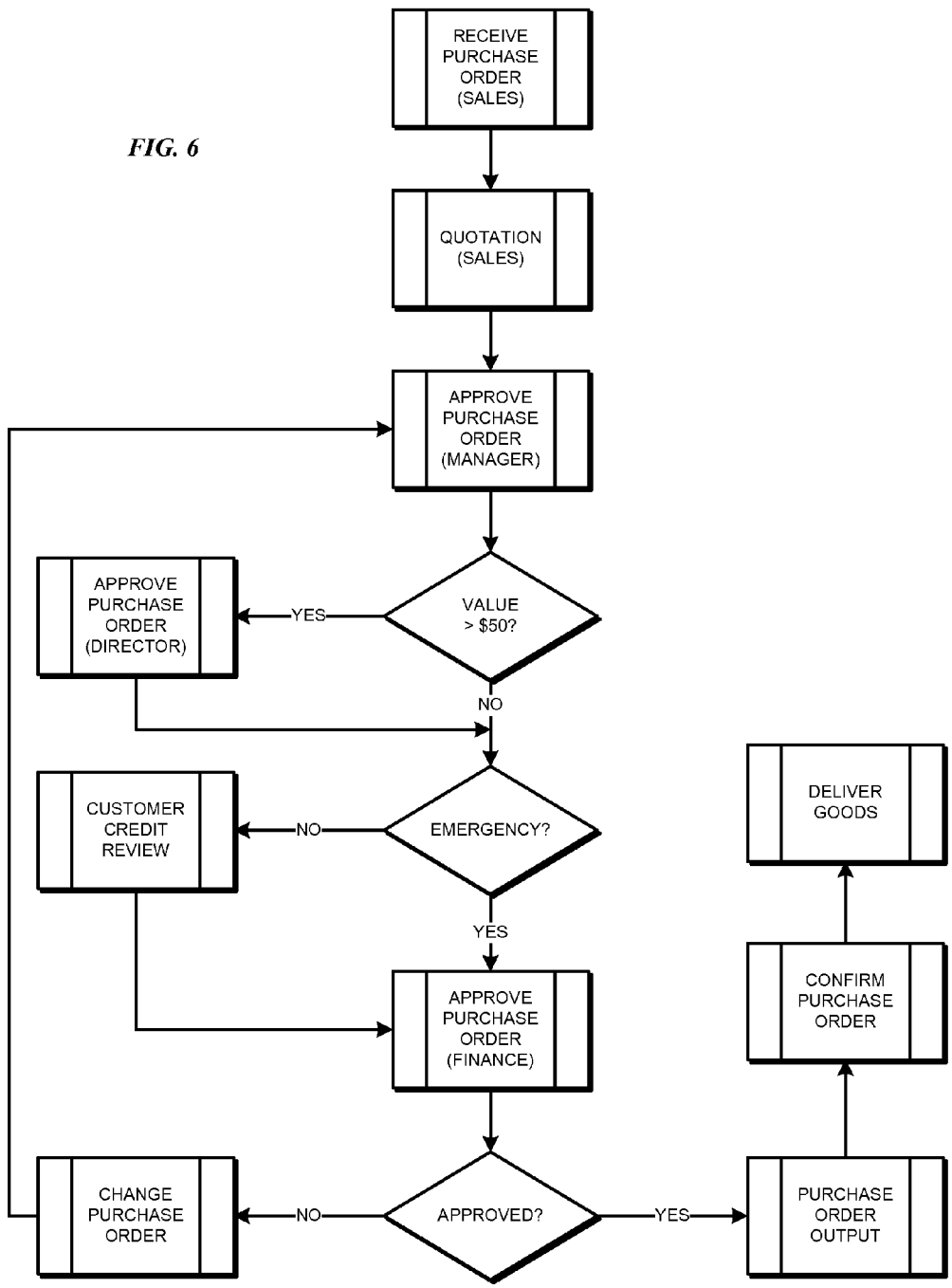
FIG. 6 shows a layout of an order flow diagram that is re-arranged based on the execution stage information according to the present invention.

FIG. 6 shows a layout of an order flow diagram that is re-arranged based on execution stage information according to the present invention. From FIG. 6, a processing path that is most often used for processing the orders with turnaround time less than 2 days and value greater than $50 can be found at a glance.

To be sure, the prominent display as referred to in the present invention is not limited to arranging the primary path as one line in the flow diagram, and the layout policy can designate any suitable manner to arrange graphic objects on the primary path. It is further possible to display the graphic objects on the primary path using visual effects such as different colors and/or highlight. Alternatively, it is further possible to simultaneously display a plurality of primary paths. Alternatively, it is further possible to display some important information (e.g. priorities) as labels on the primary path and on each node on the primary path. Those skilled in the art can further envisage other layout manners, so long as the users can distinctly identify their desired primary paths in the flow diagram.

At step 540, the process is finished.

Figure 7:
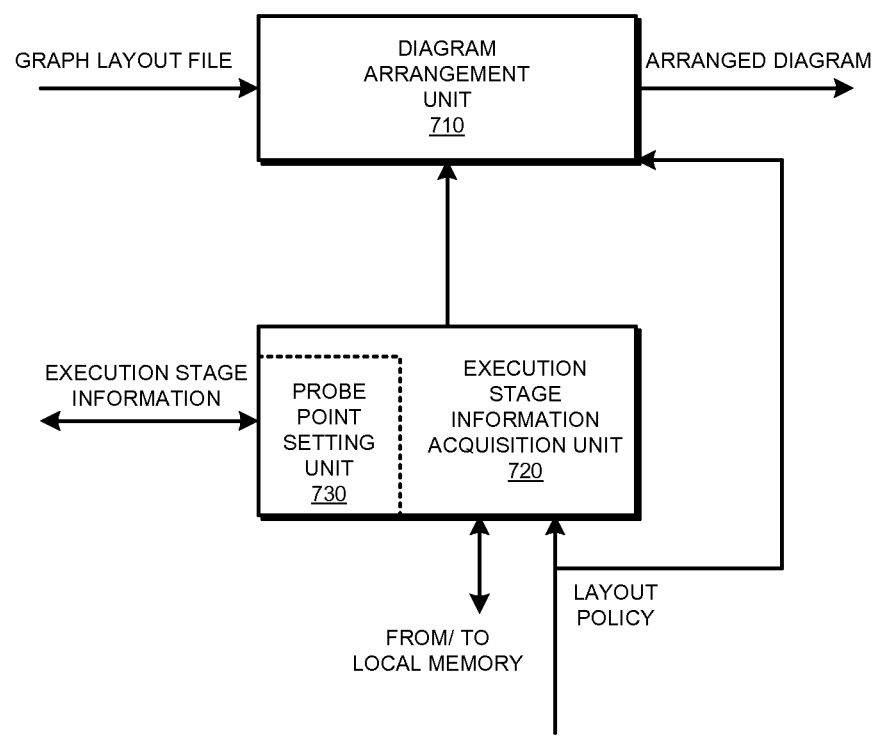
FIG. 7 is an exemplary block diagram of an apparatus for arranging graphic objects in a flow diagram based on execution stage information according to the present invention.

FIG. 7 is an exemplary block diagram of an apparatus for arranging graphic objects in a flow diagram based on execution stage information according to the present invention. The apparatus comprises a diagram arrangement unit 710 and an execution stage information acquisition unit 720.

A diagram editor is used for generating and outputting an image layout file, a diagram execution engine generates execution stage information and stores it in a memory, and both can be integrated in a single unit or implemented separately. The execution stage information acquisition unit 720 acquires the execution stage information from the memory storing the same, for example by using a designated file path or invoking interface functions provided by the diagram execution engine. As described above, if the diagram execution engine does not store the execution stage information, it is possible to acquire said execution stage information by invoking the API, i.e. probe points, provided by the diagram execution engine.

The diagram execution engine stores the collected information in for example a table titled "visited" in the memory, wherein a first column "vid" in the table titled "visited" represents one visit, and a second column "nodeId" represents an id of the visited node, and then Java codes of the information obtained are similar to the following (assume that only the number of visits to a node is collected):

```
Map hitMap = new HashMap( );
Connection conn = getDBConnection( );//get memory connection
Statement stmt = conn.createStatement("select nodeId, count(vid) from visited group by nodeId");
ResultSet rs = stmt.executeQuery( );
while(rs.next( )){
hitMap.put(rs.getInt(1), rs.getInt(2));
}
. . .
```

The execution stage information acquisition unit 720 further receives a layout policy. As described above, the layout policy can be either pre-defined or input by a user in real time. The user-defined layout policy is quantized by using one or more metrics and operates said metrics to obtain the corresponding variables. These variables can be used to find a primary path and arrange a diagram. In the foregoing order example, said variables are for example "order value", "turnaround time" and "number of orders", etc.

The execution stage information acquisition unit 720 can select part of execution stage information in accordance with the input layout policy. When the user changes the layout policy in real time, said execution stage information also changes correspondingly, and the execution stage information acquisition unit 720 needs to acquire again execution stage information from the diagram execution engine.

The execution stage information acquisition unit 720 can further fetch the entire execution stage information provided by the existing diagram execution engine to the local. Alternatively, the execution stage information acquisition unit 720 stores the acquired execution stage information to a local storage unit for later use. When the user changes the layout policy in real time, the execution stage information acquisition unit 720 can directly acquire the corresponding execution stage information from the local storage unit on the basis of the layout policy, without necessity of acquiring again the execution stage information from the diagram execution engine.

The execution stage information acquisition unit 720 further provides the acquired execution stage information to the diagram arrangement unit 710. If it is necessary to execute further processing on the acquired data according to the layout policy, for example, to calculate "turnaround time"="order submission time"–"goods received time" and "arranging according to the number of orders through each node and each path from most to least" in the above example, it is possible to execute the processing before the execution stage information acquisition unit 720 provides data to the diagram arrangement unit 710. Taking again the above example, the execution stage information acquisition unit 720 uses the obtained "order submission time" and "goods received time" to calculate the "turnaround time", and sorts the nodes and paths according to the number of orders, and then provides, to the diagram arrangement unit 710, the calculated "turnaround time" and sorted paths and related information. Said calculation is simple for those skilled in the art and is not the gist of the present invention, so details thereof are not made here. To be sure, the processing of the data can also be executed in the diagram arrangement unit 710.

Alternatively, the execution stage information acquisition unit 720 further comprises a probe point setting unit 730. When the existing diagram execution engine does not collect and store data generated in the executing process, it is necessary to set and use probe points to obtain the execution stage information. The so-called probe point is a segment of program code for invoking the API provided by the existing diagram execution engine to obtain the execution stage information. The probe point setting unit 730 is used for setting one or more probe points to be invoked by the execution stage information acquisition unit 720.

Taking IBM's Websphere Process Server (WPS) v6.0 as an example, WPS provides a Common Event Infrastructure (CEI) to help users obtain the data generated in the flow execution process, and this mechanism can be utilized to obtain desired execution information. For instance, we want to obtain the number of visits to a node, it is possible to define the CEI at each node in advance, which requires that an event should be generated upon entry to the node whenever the flow is executed and the event should be available to the users, and the users accumulate the number of visits to each node at an appropriate place (e.g. a memory).

When the flow is executed, the occurrence of events can be queried in a plurality of manners, and the following codes use "query event API":

```
Object objref = initial.lookup("ejb/com/ibm/events/access/EventAccess");
EventAccessHome eventAccessHome = (EventAccessHome)
    PortableRemoteObject.narrow(objref, EventAccessHome.class);
EventAccess eventAccess = eventAccessHome.create( );
ComonBaseEvent[ ] events = eventAccess.queryEventsByEventGroup(
    "event group name", "event Selector," true);
```

The execution stage information acquisition unit 720 invokes, when necessary, the probe point provided by the probe point setting unit 730 to collect the execution stage information. The execution stage information acquisition unit 720 can invoke the existing diagram execution engine to collect possibly obtained various data and locally store the data for later use. Subsequently, the execution stage information acquisition unit 720 locally retrieves the corresponding data according to the layout policy. Alternatively, the execution stage information acquisition unit 720 can invoke the corresponding probe point to obtain desired data based on the layout policy.

The diagram arrangement unit 710 receives the execution stage information from the execution stage information acquisition unit 720, and receives the graph layout file from the existing graph editor and the layout policy. Then the diagram arrangement unit 710 arranges graphic objects in the generated diagram based on the layout policy with consideration of the execution stage information, so that the users can readily identify a path they care from the arranged diagram. Finally, the diagram arrangement unit 710 outputs the arranged diagram.

The layout policy not only can be input by the user via a graphical user interface (GUI) and stored in a file, but also can be predefined by the user and stored in the file. The metrics/variables (e.g. turnaround time) are defined by the users. The value of each metric is calculated after the necessary execution stage information is possessed. These metrics can be used to find the primary path and arrange the diagram.

The diagram arrangement unit 710 maintains a set of improved graph layout algorithms based on the execution stage information. These algorithms, which are based on conventional algorithms, heavily consider the execution stage information as an important aspect.

In the following, a schematic flow diagram of a preferred process of arranging graphic objects according to the present invention is described, by referring to FIG. 8.

For each node among all nodes, all incoming edges are marked as ignored except a first edge complying with a layout policy, according to the algorithm of the present invention, so that we can have a spanning tree of a graph. The tree is laid out from left to right, and sibling nodes are sorted based on the layout policy. Those ignored edges are added back to the tree and alternatively, those ignored edges are arranged using the existing algorithms to minimize crossings. As a result, a primary path can be found at a glance.

Figure 8:
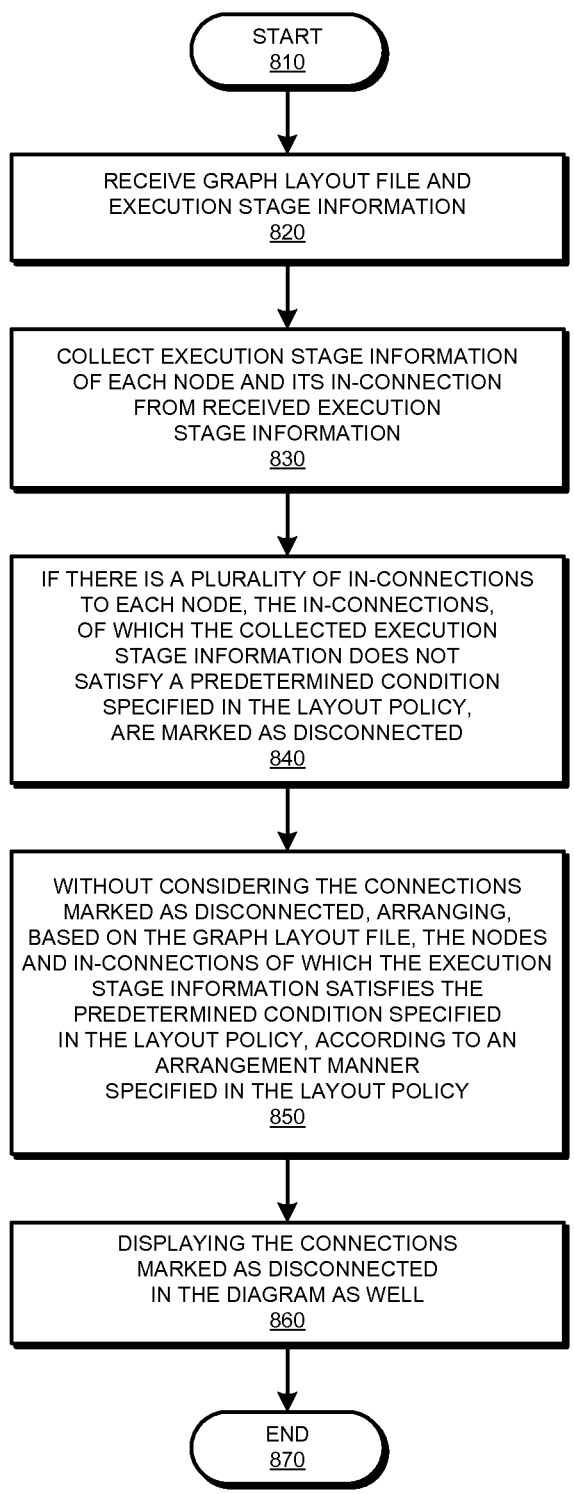
FIG. 8 is an exemplary flow diagram of a process of arranging a diagram based on execution stage information according to the present invention.

FIG. 8 is an exemplary flow diagram of a process of arranging a diagram based on execution stage information according to the present invention.

At step 810, the process starts.

At step 820, a graph layout file, a layout policy, and execution stage information are received.

At step 830, execution stage information of each node and its in-connection is collected from the received execution stage information. This step can be considered to be a data retrieval process.

At step 840, if there is a plurality of in-connections to each node, the in-connections, of which the collected execution stage information does not satisfy a predetermined condition specified in the layout policy, are marked as disconnected.

Taking the above example, all connections to each node that do not satisfy the predetermined condition specified in the layout policy, i.e. "arranging a path for processing orders with the value greater than $50 and turnaround time less than 2 days", are marked as disconnected. Thus, all in-connections to each node, through which the orders have a value greater than $50 or turnaround time less than 2 days, are marked as disconnected.

At step 850, the connections marked as disconnected are not considered, and based on the graph layout file, the nodes and in-connections, of which the execution stage information satisfies the predetermined condition specified in the layout policy, are arranged according to an arrangement manner specified in the layout policy.

Taking again the above example, the layout policy specifies the arrangement manner of "arranging nodes and paths according to the number of orders through each node and each path from most to least". According to this arrangement manner, each node and its in-connections are arranged according to the number of orders through the same from most to least, for example, a node and its in-connections through which the number of orders is the greatest are disposed on one straight line, branch nodes are arranged at one or both of the sides of the straight line according to the number of orders through the branch nodes from most to least, and connections between father nodes and child nodes are drawn. Without considering the connections marked as disconnected, the flow diagram usually should be a tree and can be readily laid out.

At step 860, the connections marked as disconnected are also displayed in the diagram when displaying the connections marked as "disconnected", and the total crossings can be minimized using the existing algorithms.

At step 870, the process is finished.

In the above example, at step 840 and step 850, the nodes and their in-connections, of which the execution stage information satisfies the predetermined condition specified in the layout policy, are displayed with colors and/or highlight in different prominent degrees, according to the arrangement manner specified in the layout policy, based on the graph layout file. In this case, step 860 is unnecessary.

Figure 1B:
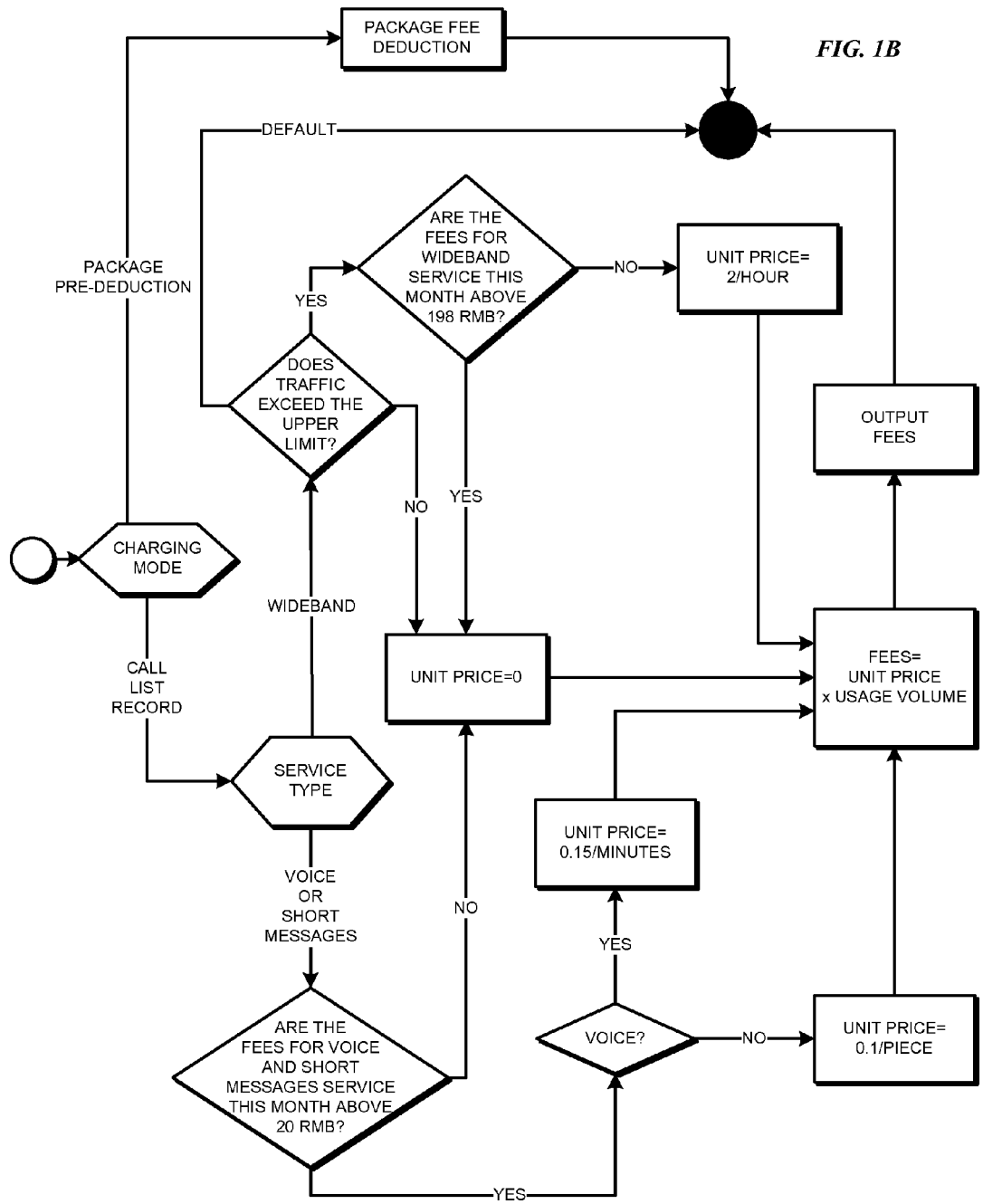
Figure 9A:
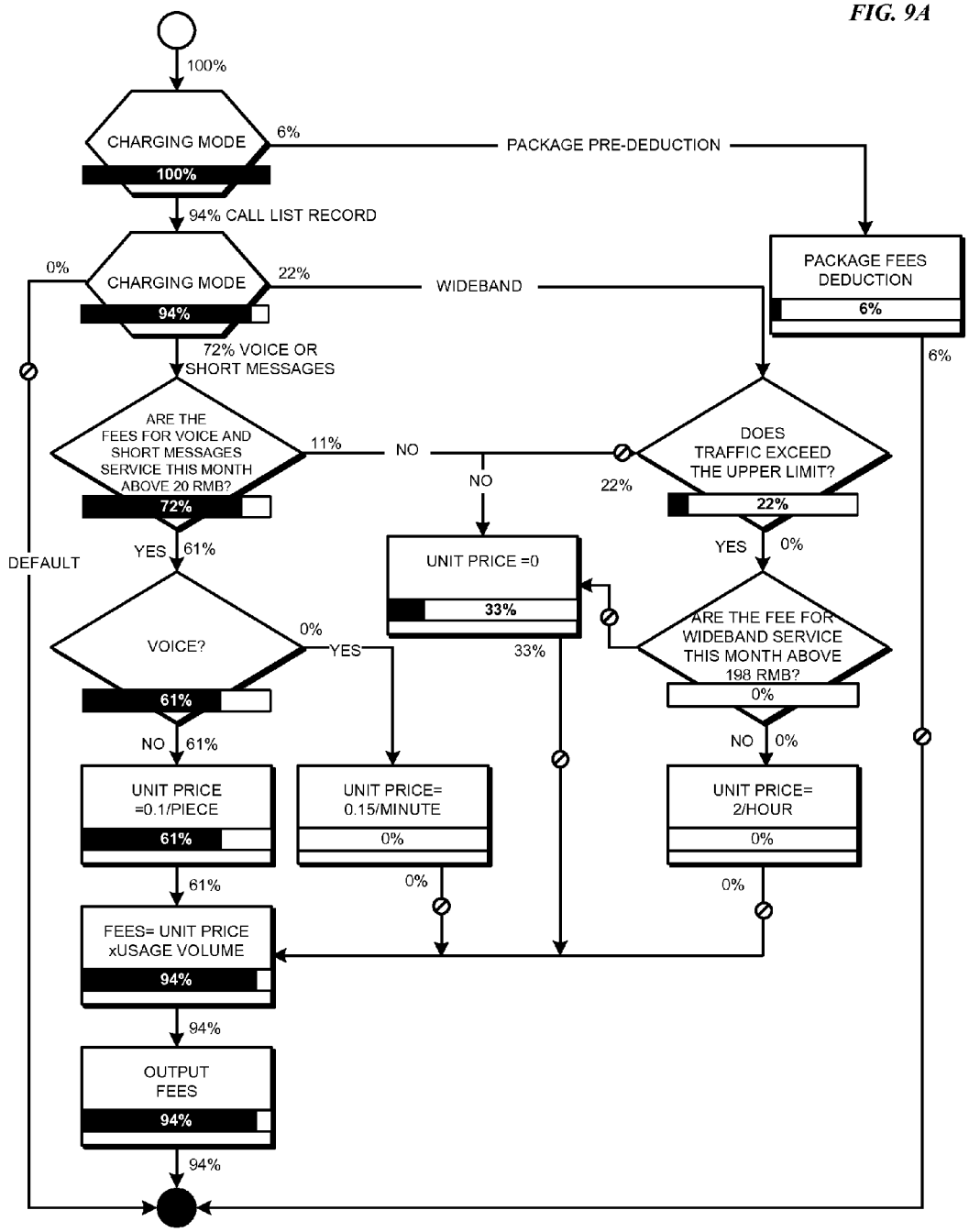
FIG. 9A is a schematic representation of a flow diagram marked based on usage information values according to the present invention.
Figure 9B:
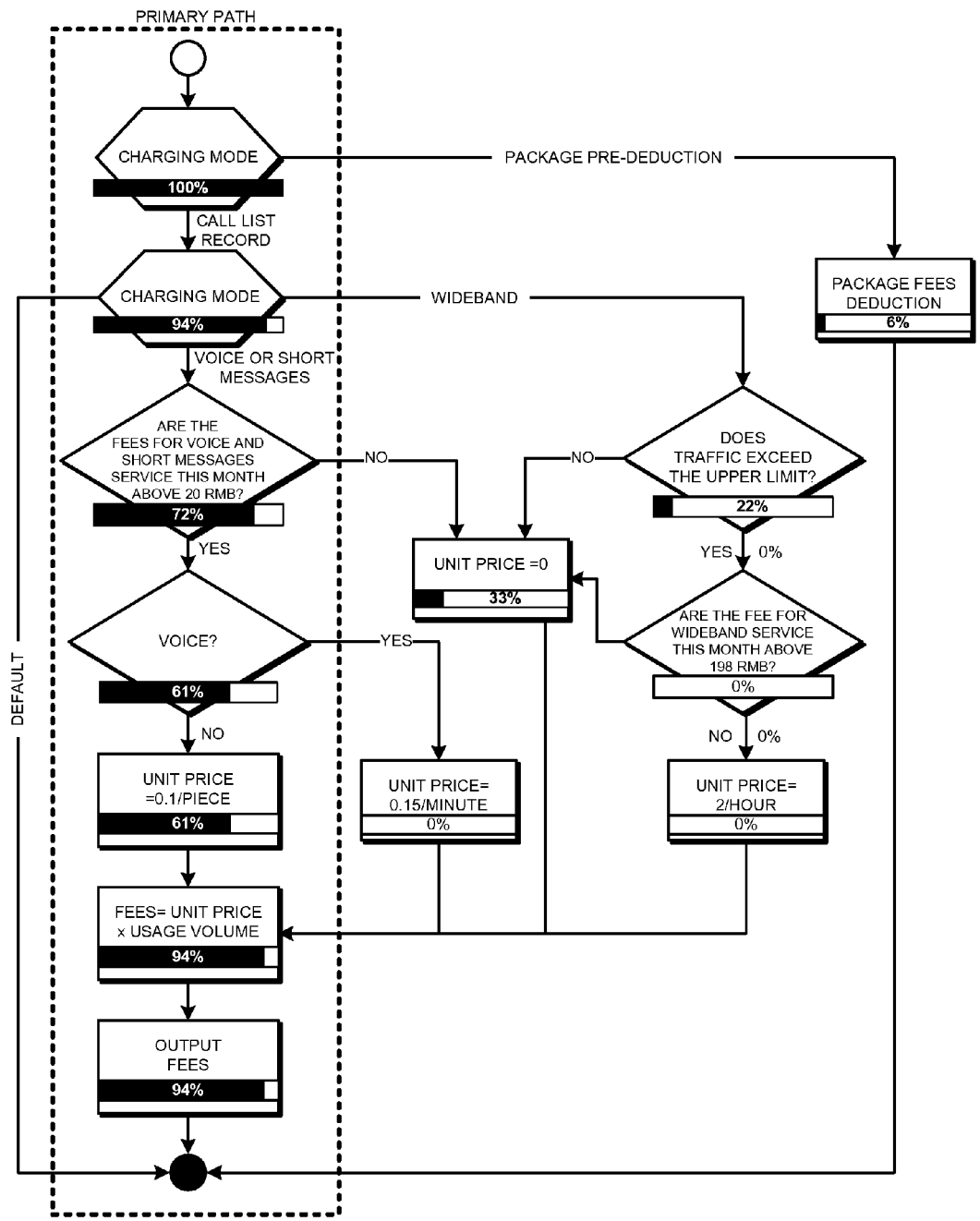
FIG. 9B is a schematic representation of a flow diagram arranged based on usage information values according to the present invention.

FIG. 9A and FIG. 9B are schematic representations of a flow diagram labeled and arranged based on usage information values according to the present invention. This flow diagram is corresponding to the flow diagram as shown in FIG. 1A and FIG. 1B.

The above example merely illustrates a preferred mode of arranging graphic objects, and those skilled in the art can thus envisage other implementation manners, which fall within the scope of protection of the present invention.

Figure 10:
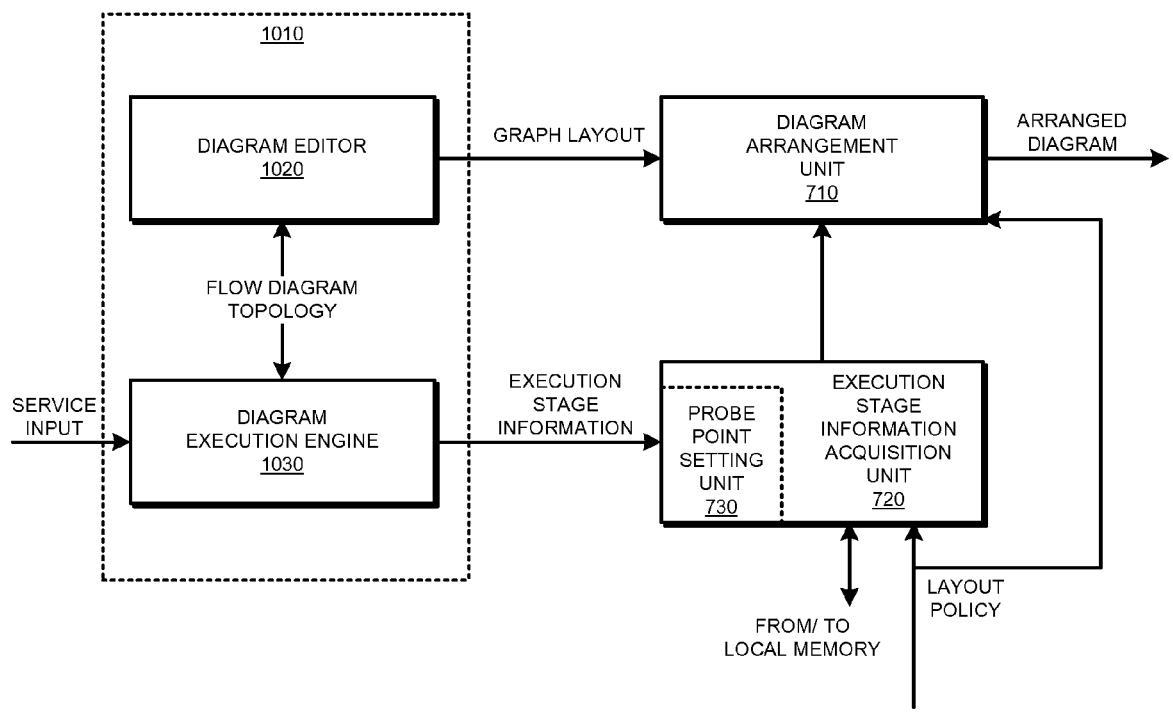
FIG. 10 is an exemplary block diagram of a system comprising an apparatus for arranging graphic objects in a flow diagram based on execution stage information according to the present invention.

FIG. 10 is an exemplary block diagram of a system comprising an apparatus for arranging graphic objects in a flow diagram based on execution stage information according to the present invention.

The system shown in FIG. 10 not only comprises an apparatus for arranging graphic objects in a flow diagram based on execution stage information as shown in FIG. 7, but comprises the prior-art diagram editor 1020 and diagram execution engine 1030. As described above, the diagram editor 1020 and the diagram execution engine 1030 can be integrated into a single component 1010. In addition, the same reference signs are used in FIG. 10 to denote the units which are the same as those in FIG. 7.

As shown in FIG. 10, the diagram editor 1020 is connected to the diagram arrangement unit 710 and the diagram execution engine 1030. The diagram editor 1020 generates a graph layout file and provides it to the diagram arrangement unit 710, generates a flow diagram topology file and provides it to the diagram execution engine 1030.

The diagram execution engine 1030 is connected to the execution stage information acquisition unit 720 and receives the flow diagram topology file from the diagram editor 1020. Then the diagram execution engine 1030 executes the flow diagram based on the flow diagram topology file and generates the execution stage information for use by the execution stage information acquisition unit.

The implementation of the present invention can be realized by means of hardware, software, firmware or combinations thereof. Those skilled in the art should realize that, it is also possible to embody the present invention in a computer program product disposed on a signal carrier medium for use in any suitable data processing system. The signal carrier medium can be a transmission medium or a computer usable storage device for machine-readable information. The examples of the computer usable storage device comprise a magnetic disk or floppy disk in a hard disk drive, an optical disk for use in a CD-ROM, a magnetic tape, and other devices those skilled in the art can envisage. Those skilled in the art should realize that, any communication terminal having a suitable programming device is able to execute the steps of the method according to the present invention as embodied in the program product. The term "computer usable storage device" does not encompass a signal propagation media such as a copper cable, optical fiber or wireless transmission media.

It should be appreciated that, the embodiments of the present invention are described above with reference to different functional means and processors for the sake of clarity. Obviously, any suitable function distribution can be used between the different functional components or processors, without departing from the present invention. For example, the illustrated functions executed by a separate unit or processor can be executed by the same unit or processor. Thus, only the description of the specific functional means is considered as a description of a suitable device for providing said functions, but does not represent a strict logic or physical structure or organization.

Furthermore, the order of the features in the claims does not represent any specific order in which the features function, and particularly, the order of the steps in method claims does not represent that these steps must be executed in this order. Conversely, these steps can be executed in any suitable order.

The present invention is described with detailed illustrations of the embodiments of the present invention, and these embodiments are provided as examples and do not intend to limit the scope of the present invention. The embodiments described comprise different features and not all these features are needed in all the embodiments in the present invention. Some embodiments in the present invention merely utilize some features or possible combinations of features. The variations of the embodiments of the present invention described and the embodiments including different combinations of the features recited in the embodiments described can be envisaged by those skilled in the art.

What is claimed is:

1. A method for processing graphic objects in a flow diagram, comprising the steps of:
    obtaining a flow diagram, the flow diagram being a part of a flow diagram topology file stored in a computer readable storage, wherein said flow diagram is executed by a diagram execution engine;
    inserting probe points, in a process that is executing the flow diagram, for invoking an interface provided by the diagram execution engine to obtain execution stage information;
    obtaining the execution stage information, wherein the execution stage information is data generated when executing said flow diagram, wherein the execution stage information includes information about a plurality of in-connections of a node in the flow diagram;

obtaining a layout policy, wherein said layout policy at least designates the conditions for determining a primary path in the flow diagram using the execution stage information;

selecting those in-connections from the plurality of in-connections of the node whose information does not satisfy a predetermined condition specified in the layout policy;

marking, without disconnecting the node, the selected in-connections as disconnected from the node, wherein connecting a second node to the node uses another in-connection of the node that is not marked as disconnected;

determining the primary path using the execution stage information based on the layout policy; and displaying prominently said primary path during displaying said flow diagram.

2. The method according to claim 1, further comprising re-obtaining said execution stage information from said probe points when said layout policy is changed.

3. The method according to claim 1, further comprising: storing the execution stage information obtained in a memory, wherein said execution stage information is obtained from the memory when said layout policy is changed.

4. The method according to claim 1, wherein said layout policy is quantized using at least a variable and at least a metric describing each variable, a value of said variable being calculated from a value of the metric representing the variable; and wherein the step of obtaining the execution stage information comprises:

obtaining said execution stage information based on said metrics.

5. The method according to claim 1, wherein said layout policy further designates an arrangement manner of graphic objects on the primary path, and the step of displaying prominently said primary path during displaying said flow diagram comprises:

arranging the graphic objects on the primary path according to the arrangement manner specified in the layout policy.

6. The method according to claim 1, wherein the step of displaying prominently said primary path comprises:

displaying the graphic objects on the primary path with a different visual effect from that of other graphic objects.

7. The method according to claim 1, wherein said layout policy further designates a basis for arranging graphic objects other than the primary path, the method further comprising:

arranging said graphic objects other than the primary path according to the basis specified in the layout policy.

8. An apparatus for processing graphic objects in a flow diagram, comprising:

a storage device including a storage medium, wherein the storage device stores computer usable program code; and a processor, wherein the processor executes the computer usable program code, and wherein the computer usable program code comprises:

computer usable code for obtaining a flow diagram, the flow diagram being a part of a flow diagram topology file, wherein said flow diagram is executed by a diagram execution engine;

computer usable code for inserting probe points, in a process that is executing the flow diagram, for invoking an interface provided by the diagram execution engine to obtain execution stage information;

computer usable code for obtaining the execution stage information, wherein the execution stage information is data generated when executing said flow diagram, wherein the execution stage information includes information about a plurality of in-connections of a node in the flow diagram;

computer usable code for obtaining a layout policy, wherein said layout policy at least designates the conditions for determining a primary path in the flow diagram using the execution stage information;

computer usable code for selecting those in-connections from the plurality of in-connections of the node whose information does not satisfy a predetermined condition specified in the layout policy;

computer usable code for marking, without disconnecting the node, the selected in-connections as disconnected from the node, wherein connecting a second node to the node uses another in-connection of the node that is not marked as disconnected;

computer usable code for determining the primary path using the execution stage information based on the layout policy; and computer usable code for displaying prominently said primary path during displaying said flow diagram.

9. The apparatus according to claim 8, further comprising computer usable code for re-obtaining said execution stage information from said probe points when said layout policy is changed.

10. The apparatus according to claim 8, further comprising: computer usable code for storing the execution stage information obtained in a memory and obtaining said execution stage information from the memory when said layout policy is changed.

11. The apparatus according to claim 8, wherein said layout policy is quantized using at least a variable and at least a metric describing each variable, a value of said variable being calculated from a value of the metric representing the variable; and wherein the computer usable code for obtaining the execution stage information is configured to obtain said execution stage information based on said metrics.

12. The apparatus according to claim 8, wherein said layout policy further designates an arrangement manner of graphic objects on the primary path, and the computer usable code for displaying prominently said primary path during displaying said flow diagram comprises:

computer usable code for arranging the graphic objects on the primary path according to the arrangement manner specified in the layout policy.

13. The apparatus according to claim 8, wherein the computer usable code for displaying prominently said primary path during displaying said flow diagram comprises:

computer usable code for displaying the graphic objects on the primary path with a different visual effect from that of other graphic objects.

14. The apparatus according to claim 8, wherein said layout policy further designates a basis for arranging graphic objects other than the primary path, the apparatus further comprising:

computer usable code for arranging said graphic objects other than the primary path according to the basis specified in the layout policy.

15. A computer usable program product comprising a non-transitory computer readable medium including computer usable code for processing graphic objects in a flow diagram, the computer usable code comprising:

computer usable code for obtaining a flow diagram, the flow diagram being a part of a flow diagram topology file stored in a computer readable storage, wherein said flow diagram is executed by a diagram execution engine;

computer usable code for inserting probe points, in a process that is executing the flow diagram, for invoking an interface provided by the diagram execution engine to obtain execution stage information;

computer usable code for obtaining the execution stage information, wherein the execution stage information is data generated when executing said flow diagram, wherein the execution stage information includes information about a plurality of in-connections of a node in the flow diagram;

computer usable code for obtaining a layout policy, wherein said layout policy at least designates the conditions for determining a primary path in the flow diagram using the execution stage information;

computer usable code for selecting those in-connections from the plurality of in-connections of the node whose information does not satisfy a predetermined condition specified in the layout policy;

computer usable code for marking, without disconnecting the node, the selected in-connections as disconnected from the node, wherein connecting a second node to the node uses another in-connection of the node that is not marked as disconnected;

computer usable code for determining the primary path using the execution stage information based on the layout policy; and computer usable code for displaying prominently said primary path during displaying said flow diagram.

16. The computer usable program product according to claim 15, further comprising computer usable code for re-obtaining said execution stage information from said probe points when said layout policy is changed.

17. The computer usable program product according to claim 15, further comprising: computer usable code for storing the execution stage information obtained in a memory, wherein said execution stage information is obtained from the memory when said layout policy is changed.

* * * * *